(12) United States Patent
Murakami

(10) Patent No.: US 7,538,660 B2
(45) Date of Patent: May 26, 2009

(54) WHEEL CONDITION DETECTOR AND WHEEL CONDITION MONITOR

(75) Inventor: Hideki Murakami, Toyota (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 53 days.

(21) Appl. No.: 11/835,086

(22) Filed: Aug. 7, 2007

(65) Prior Publication Data

US 2008/0055059 A1 Mar. 6, 2008

(30) Foreign Application Priority Data

Sep. 6, 2006 (JP) ............... 2006-241155

(51) Int. Cl.
*B60C 23/00* (2006.01)
(52) U.S. Cl. ............ 340/442; 73/146; 340/438
(58) Field of Classification Search .......... 340/442, 340/438; 73/146–146.8
See application file for complete search history.

(56) References Cited

U.S. PATENT DOCUMENTS

| | | | | |
|---|---|---|---|---|
| 6,025,777 | A * | 2/2000 | Fuller et al. ............ | 340/442 |
| 6,769,319 | B2 * | 8/2004 | McDonald et al. ........ | 73/866.1 |
| 6,801,126 | B2 * | 10/2004 | Harm ................... | 340/442 |
| 6,868,717 | B2 * | 3/2005 | Koch et al. ............ | 73/146 |
| 7,014,888 | B2 * | 3/2006 | McDonald et al. ........ | 427/558 |
| 7,028,541 | B2 * | 4/2006 | Uleski et al. .......... | 73/146.8 |
| 7,161,476 | B2 * | 1/2007 | Hardman et al. ......... | 340/442 |

FOREIGN PATENT DOCUMENTS

| | | |
|---|---|---|
| DE | 699 02 688 T2 | 7/2003 |
| JP | 7-223414 | 8/1995 |
| JP | 2001-174356 | 6/2001 |
| JP | 2004-526217 | 8/2004 |
| JP | 2005-263034 | 9/2005 |
| JP | 2006-33689 | 2/2006 |
| JP | 2006-74351 | 3/2006 |
| JP | 2006-234481 | 9/2006 |

* cited by examiner

*Primary Examiner*—Eric M Blount
(74) *Attorney, Agent, or Firm*—Oblon, Spivak, McClelland, Maier & Neustadt, P.C.

(57) ABSTRACT

A wheel condition detector and a wheel condition monitor, each having a case provided in an internal space defined between a tire and a wheel member, the tire and the wheel member forming a wheel. The case has a detection space formed therein and a communication section for communicating an interior and an exterior of the detection space with each other. The wheel condition detector or the wheel condition monitor has: a condition sensor located in the detection space that detects a condition of the wheel; and a restriction section that restricts an entry of foreign matter present in the internal space into the detection space through the communication section.

12 Claims, 7 Drawing Sheets

WHEEL CONDITION DETECTOR AND WHEEL CONDITION MONITOR

INCORPORATION BY REFERENCE

The disclosure of Japanese Patent Application No. 2006-241155 filed on Sep. 6, 2006 including the specification, drawings and abstract is incorporated herein by reference in its entirety.

BACKGROUND OF THE INVENTION

1. Field of the Invention

The present invention relates to a wheel-mounted wheel condition detector that detects the condition of each wheel. The present invention also relates to a wheel condition monitor that monitors the condition of each wheel, the monitor having a wheel-mounted device that transmits information for each wheel and a vehicle-mounted device that receives the information from each wheel.

2. Description of the Related Art

A conventional tire pressure monitoring system (hereinafter referred to as "TPMS") generally includes a wheel-mounted device and a vehicle-mounted device. The wheel-mounted device is designed to sense tire air pressure (hereinafter sometimes referred to as "tire pressure") of each wheel. The vehicle-mounted device is designed to acquire information on the tire pressure of each wheel from the wheel-mounted device, and monitor the tire pressure of the wheel (See JP-A-2001-174356).

In the TPMS, a tire pressure sensor as the wheel-mounted device has a detecting section located in an internal space defined between the tire and the wheel member. The detecting section takes the form of a case to accommodate a tire pressure detecting element, a wireless transmitter for transmitting a detection signal of the tire pressure detecting element to the vehicle-mounted device, and so forth. The case has an air passage hole for directing air in the internal space to a specific detection space within the case. The vehicle-mounted device receives the tire pressure information from the wheel-mounted device, and warns the driver (e.g. displays specified alarm information) if the tire pressure is below predetermined reference tire pressure.

However, TPMS-equipped vehicles are not allowed to use a repair liquid for flat tires.

The recent trends show that a traditional spare tire is replaced with a flat tire repair kit including a repair agent, due to the growing demand for a spacious trunk with larger luggage storage capacity or for a roomier compartment to accommodate the three-row seating arrangement.

Generally, the repair of a flat tire is carried out as below, using such flat tire repair kit that includes a bottle of tire repair liquid, a hose connector, and a compressor. The hose connector is used to connect the liquid bottle and an air valve on the wheel. Then, the liquid bottle is manually compressed to inject the tire repair liquid into the tire. Subsequently, the compressor is connected to the air valve to send air into the tire. After that, the vehicle is started to let the tire repair liquid spread all over the inside of the tire.

However, while the vehicle is in motion, the injected tire repair liquid may be scattered within the tire, and enter the case of the tire pressure sensor through the air passage hole of the case. Such liquid may adhere to the tire pressure detecting element or clog the air passage hole.

This phenomena caused by the tire repair liquid may apply not only to the TPMS, but also to any wheel condition detector and wheel condition monitor, in which a detecting section for detecting a wheel condition is provided in an internal space defined between the tire and the wheel member, and the interior and exterior of the detection section are communicated with each other. A sensor for detecting the wheel condition is preferably designed to prevent the entry of a tire repair agent as well as water and other foreign matter.

SUMMARY OF THE INVENTION

The present invention provides a wheel condition detector and a wheel condition monitor, which prevent foreign matter as much as possible from entering a wheel condition detection space through a communication section, thereby maintaining normal detection performance.

A wheel condition detector according to a first aspect of the invention has a case located in an internal space defined between a tire and a wheel member, the tire and the wheel member forming a wheel. The case has a detection space formed therein and a communication section for communicating the detection space with the internal space. The wheel condition detector includes: a condition sensor located in the detection space for detecting a wheel condition; and a restriction means that restricts the entry of foreign matter present in the internal space into the detection space through the communication section.

The term "wheel condition" herein may mean any conditions as long as the condition sensor requires the communication section for the case to detect the applicable condition. The examples include tire conditions, such as air pressure and temperature, and different wheel conditions, other than the tire conditions, such as battery voltage. In addition, the term "foreign matter" herein may mean any material as long as the material can enter the detection space through the communication section and impair desired detection performance of the condition sensor. Examples include the aforementioned repair agent for flat tires, water and other exfoliated materials of the tire. Further, the term "communication section" herein may mean a communication hole that is drilled into the case or a gap that is created between components of the case. Still further, the restriction means herein may be designed to completely stop the foreign matter from entering the detection space through the communication section. Alternatively, the restriction means may be designed to restrict and reduce the entry of the foreign matter significantly.

According to the first aspect of the invention, the case is located in the internal space defined between the tire and the wheel member, and the condition sensor is located in the detection space within the case. The case is provided with the communication section for communicating the detection space with the internal space. However, the restriction means restricts the entry of the foreign matter into the detection space through the communication section. Therefore, the foreign matter, which may be present in the internal space, is prevented as much as possible from contacting the condition sensor, thus having no adverse effect on the accuracy of the detection by the condition sensor. Thereby, the condition sensor maintains normal detection performance.

The restriction means may include mode switching means for switching the communication section from communication mode to disconnection mode, if a preset condition, under which the foreign matter is expected to enter, is met. The term "preset condition, under which the foreign matter is expected to enter" herein may mean any conditions under which the foreign matter may enter through the communication section due to the wheel condition during a certain vehicle driving condition. Such conditions are obtained empirically or experimentally.

Therefore, if the foreign matter is less likely to enter, the communication section is held in communication mode to maintain detection performance of the condition sensor. If the foreign matter is more likely to enter, it is prevented or suppressed from entering the detection space.

The mode switching means may bring the communication section into disconnection mode, if a centrifugal force applied to the wheel is equal to or below a predetermined value. The mode switching means may bring the communication section into communication mode, if the centrifugal force applied to the wheel exceeds the predetermined value. The term "predetermined value" herein may mean, for example, the force of gravity acting on the wheel.

More specifically, when the centrifugal force applied to the wheel increases to a certain level as the vehicle moves, this centrifugal force presses the foreign matter on an inner circumferential surface of the tire, making the foreign matter stable thereon. Thus, the foreign matter is less likely to be scattered within the tire. Accordingly, the foreign matter is less likely to enter the detection space through the communication section. There seem to appear no adverse effects of the communication section brought into communication mode. In contrast, when the centrifugal force applied to the wheel is equal to or below a predetermined value, gravity acts more effectively on the foreign matter, which are more likely to be scattered within the tire. Therefore, the communication section is brought into disconnection mode to prevent the entry of the foreign matter as much as possible.

The communication section may include a communication hole. The mode switching means may include: an opening-closing member for opening or closing the communication hole to or from the internal space; and an elastic member that impels the opening-closing member in the closing direction. The opening-closing member may be designed to close the communication hole if the centrifugal force is equal to or below a predetermined value, and to open the communication hole against the impelling force of the elastic member if the centrifugal force exceeds the predetermined value.

The term "opening-closing member" herein may mean a lid member designed to open or close the communication hole formed through the case. Alternatively, the opening-closing member may have a communication passage therein, which is opened or closed in accordance with the movement of the opening-closing member relative to the case.

Therefore, the opening-closing member mechanically moves to open or close the communication hole depending on the proportion between the impelling force of the elastic member and the centrifugal force. This eliminates the necessity of additional devices, such as a sensor for detecting a centrifugal force and an actuator for actuating the opening-closing member. Therefore, the present invention is embodied with a simple configuration.

The opening-closing member may slide within the communication hole or in an area near an opening of the communication hole in order to discharge the foreign matter out of the communication hole.

Thus, the movement of the opening-closing member allows the foreign matter to be naturally removed from the inside of the communication hole or the area near the opening of the communication hole. Therefore, the communication hole is held in communication mode favorably for detection by the condition sensor.

The wheel condition detector may further include: transmission means for sending wheel information that indicates a wheel condition detected by the condition sensor to a vehicle-mounted device; a disconnection detecting sensor that detects if the communication section is brought into disconnection mode by the mode switching means; and transmission restriction means for prohibiting the transmission means from sending the wheel information or for invalidating the wheel information, if the disconnection detecting sensor detects that the communication section is brought into disconnection mode.

Thus, when it is detected that the communication section is in disconnection mode, the wheel information is prohibited from being sent to the vehicle-mounted device, or the wheel information is invalidated and then transmitted. In the latter case, the wheel information may be sent with an additional flag to indicate that the wheel information is invalid. In this case, the vehicle-mounted device reads the flag, recognizes that the received wheel information is invalid, and abandons the invalid information.

More specifically, when the communication section is in the disconnection mode, the interior of the case or the detection space is disconnected from the exterior of the case or the internal space. This may produce different conditions between the detection space and the internal space. Assuming that the wheel condition is detected in the detection space under such conditions and sent as wheel information to the vehicle-mounted device, based on the wheel information, the vehicle-mounted device may perform the improper step. For example, the vehicle-mounted device performing the step of alarming based on the received wheel information, the vehicle-mounted device can produce an error alert. Thus, when the communication section is in disconnection mode, the wheel information is prohibited from being sent or is invalidated, thereby preventing the vehicle-mounted device from performing the step based on the incorrect wheel information. In such case, particularly, prohibiting any wheel information from being sent minimizes the waste of power consumed for information transmission.

The wheel condition detector may further include: stop state detecting means for detecting if the wheel stops rotating; and an actuator that actuates the mode switching means. The actuator may actuate the mode switching means to bring the communication section into communication mode after a predetermined period of time has elapsed since the stop state detecting means detects that the wheel stops rotating.

It is thus conceivable that, when the vehicle stops, the foreign matter is displaced with time to the bottom surface of the tire due to the gravity. Therefore, the foreign matter thus displaced does not enter through the communication section, which brings the communication section into communication mode. This therefore enables detection of the wheel condition while the vehicle is stopped.

According to a second aspect of the invention, a wheel condition monitor includes: a wheel-mounted device that sends wheel information that indicates a wheel condition to the vehicle body; and a vehicle-mounted device that monitors the wheel condition based on the wheel information received from the wheel-mounted device. The wheel-mounted device of the wheel condition monitor has a case located in an internal space defined between a tire and a wheel member. The case has a detection space formed therein and a communication section that communicates with the detection space with the internal space. The wheel-mounted device includes: a condition sensor, located in the detection space, that detects a wheel condition; and a restriction means that restricts the entry of foreign matter present in the internal space into the detection space through the communication section.

The terms "wheel condition," "foreign matter," and "communication section" herein have already been defined above.

According to the second aspect of the invention, the restriction means restricts the entry of the foreign matter into the detection space through the communication section. This allows the condition sensor to maintain normal detection performance, even though foreign matter may be present in the internal space. The wheel-mounted device thus sends correct wheel information. Consequently, based on the correct wheel information, the vehicle-mounted device performs the proper step.

The restriction means may include a mode switching means that switches the communication section from communication mode to disconnection mode, if a preset condition, under which the foreign matter is expected to enter, is met.

The wheel condition monitor may further include: a disconnection detecting sensor that detects if the communication section is brought into disconnection mode by the mode switching means; a transmission restriction means that prohibits the wheel-mounted device from sending the wheel information or for invalidating the wheel information to be sent from the wheel-mounted device.

The wheel-mounted device may be provided with functions of the "disconnection detecting sensor" and the "transmission restriction means," as in the case with the aforementioned wheel condition detector. However, the wheel-mounted device and the vehicle-mounted device may work in conjunction with each other for "invalidating the wheel information." To be more specific, the wheel-mounted device may send the wheel information, obtained when the communication section is disconnected, with additional identifying information to indicate invalidity of the wheel information. Also, the vehicle-mounted device may recognize that the wheel information with the additional identifying information is invalid. Particularly, if the foreign matter is a repair agent for flat tires, the following effects are obtained. Having a high viscosity, the repair agent for flat tires is difficult to remove from any member once it adheres to the member. In view of this, the restriction means is provided for preventing the entry of the repair agent for flat tires, as described above. The restriction means prevents the repair agent for flat tires from adhering to the condition sensor or other members inside the communication section. This therefore minimizes adverse effects on detection by the condition sensor.

BRIEF DESCRIPTION OF THE DRAWINGS

The foregoing and further objects, features and advantages of the invention will become apparent from the following description of example embodiments with reference to the accompanying drawings, wherein like numerals are used to represent like elements and wherein.

DETAILED DESCRIPTION OF THE EXAMPLE EMBODIMENTS

One embodiment of the present invention will be described below in detail with reference to accompanying drawings.

Figure 1:
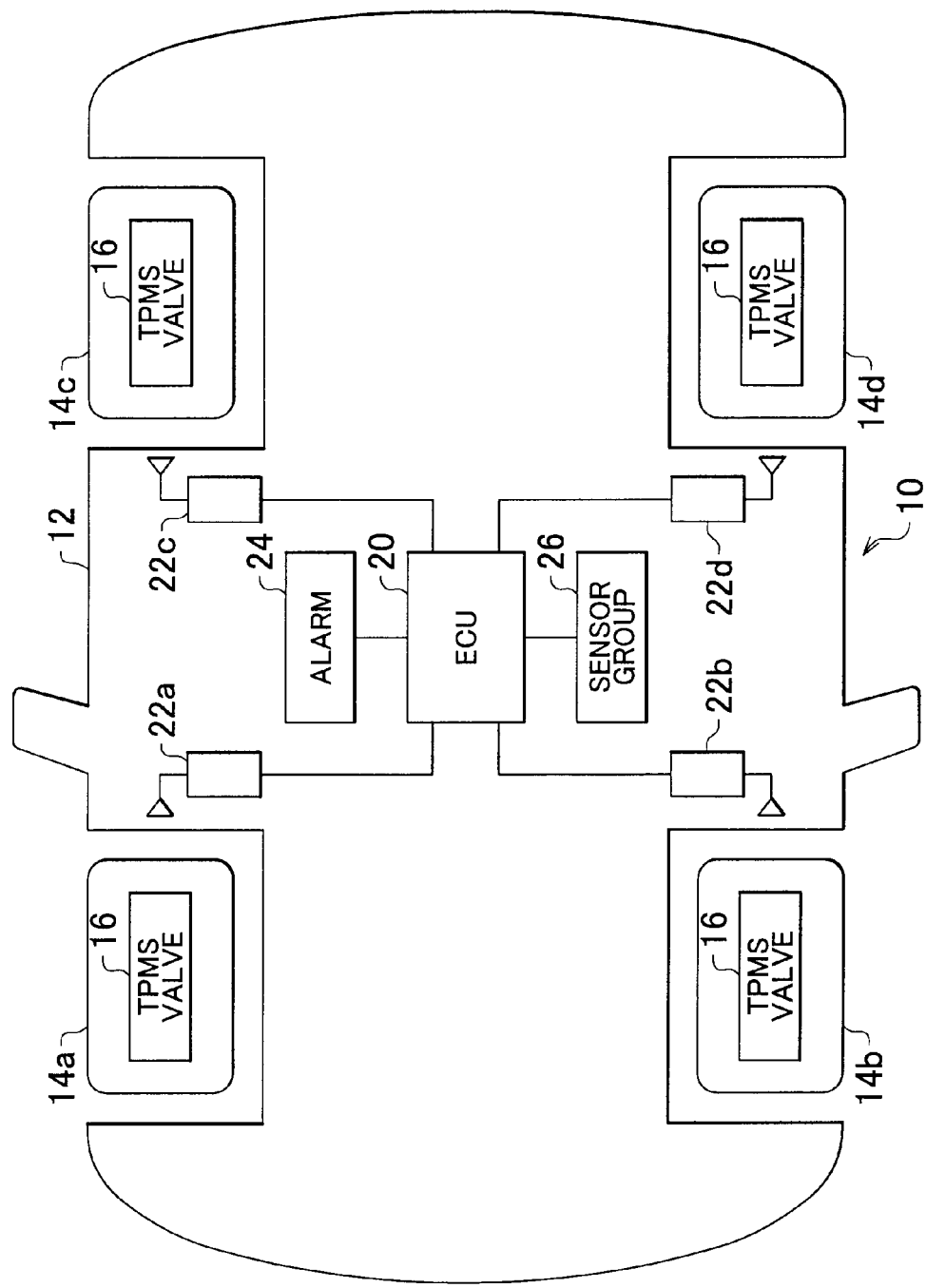
FIG. 1 is a schematic diagram of a vehicle having a wheel condition monitor according to the first embodiment of the invention.
Figure 2:
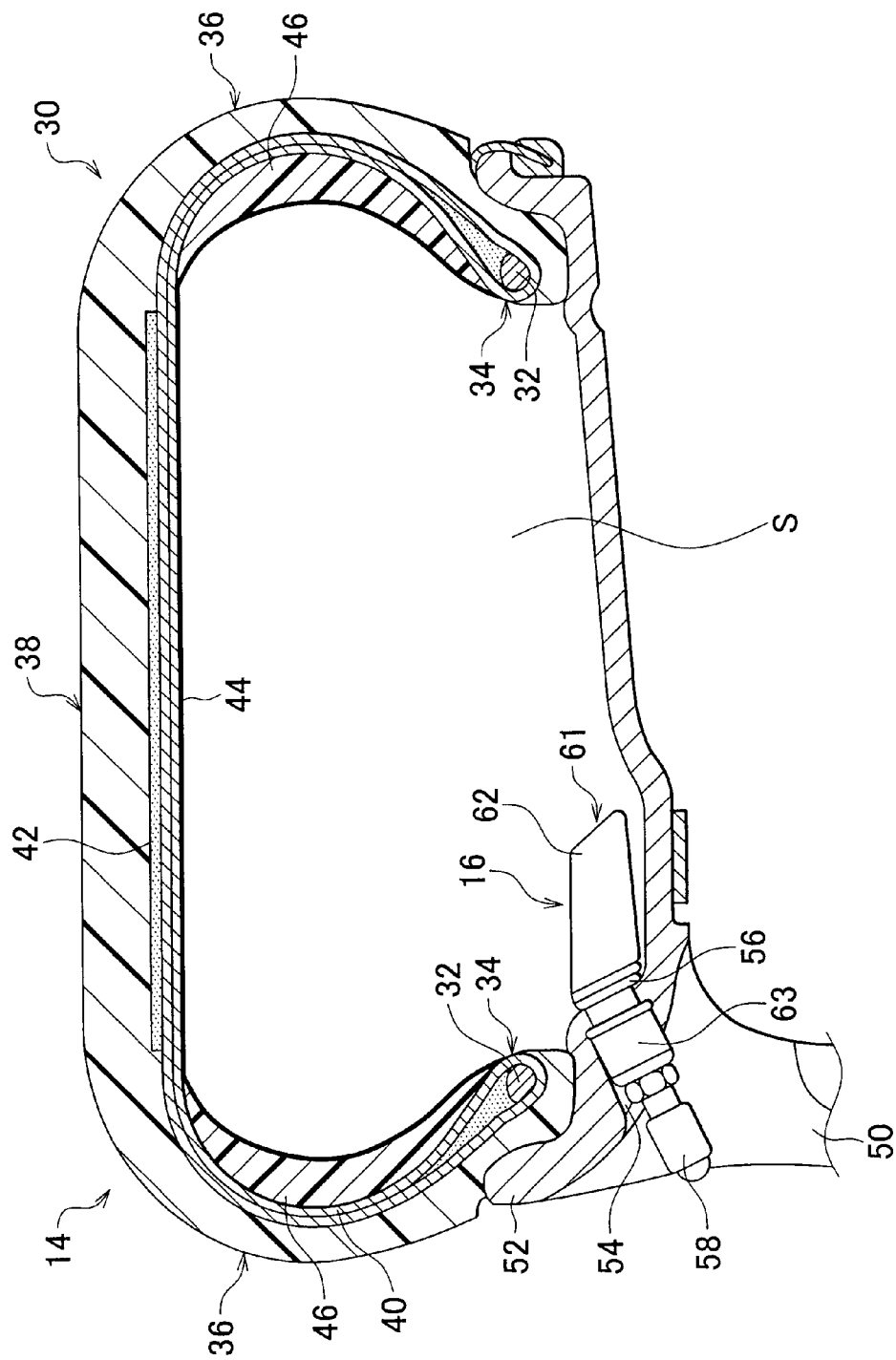
FIG. 2 is a partial sectional view of a wheel mounted on the vehicle of FIG. 1.

FIG. 1 is a schematic diagram of a vehicle having a wheel condition monitor according to the first embodiment of the invention. FIG. 2 is a partial sectional view of a wheel mounted on the vehicle of FIG. 1. As shown in FIG. 1, a vehicle 10 has four wheels rotatably supported on a vehicle body 12. They include a right front wheel 14a, a left front wheel 14b, a right rear wheel 14c, and a left rear wheel 14d (hereinafter sometimes collectively called as "wheel 14"). Various units are mounted on the vehicle body 12, such as engine, transmission, steering system, brake system (they are not shown), and electronic control unit (hereinafter referred to as "ECU"). The engine is a driving source for driving wheels. The transmission is designed to transmit a driving force at a given gear ratio. The steering system is designed to steer the wheels. The brake system is designed to apply a braking force to the wheels. The ECU is designed to control these units.

The wheel 14, including a tire and a wheel member, has a built-in TPMS valve 16. The TPMS valve 16 adjusts the tire air pressure. In the embodiment of the invention, the TPMS valve 16 corresponds to a wheel-mounted device that serves as a wheel condition detector.

In turn, the communication units 22 and an ECU 20 are mounted on the vehicle body 12. Each communication unit 22 receives wheel information from the TPMS valve 16 on the wheel 14. The details of the communication unit 22 will be discussed later. The ECU 20 monitors the condition of the wheel 14 based on the received wheel information.

As shown in FIG. 2, a tire 30, included in the wheel 14, is a run-flat tire that enables the vehicle to continue to run when the tire pressure drops. The tire 30 includes a pair of beads 34, each bead embedding a bead core 32 therein, a pair of sidewalls 36, and a tread 38. Each sidewall 36 extends radially outward from the bead 34. The tread 38 extends between the pair of the sidewalls 36. A carcass 40 is embedded in the pair of beads 34, the pair of sidewalls 36 and the tread 38. For example, the carcass 40 may be a sheet of fiber material. A belt layer 42 is also embedded in the tread 38 on the outer side of the carcass 40. A rubber reinforcement 46 is embedded in each sidewall 36 inside of an inner liner 44. The rubber reinforcement 46 has high rigidity. When the vehicle has a flat tire, which lowers the tire air pressure in the internal space defined between a wheel member 50 and the tire 30, the rubber reinforcement 46 helps the entire tire 30 be supported on the wheel member 50. Such run-flat system allows the vehicle to continue driving.

The TPMS valve 16 is attached to the wheel 14. The TPMS valve 16 is used to adjust the air pressure in the tire 30. The TPMS valve 16 has a detecting section 61, disposed in an internal space S defined between the tire 30 and the wheel member 50. The TPMS valve 16 includes a case 62 and an air passage section 63. The case 62 protrudes toward the internal space S and accommodates several sensors, which will be discussed later. The air passage section 63 is formed integrally with the case 62. Air is introduced through the air passage section 63 into the internal space S for adjusting the air pressure. Normally, a valve cap 58 is attached to a distal end of the air passage section 63 to ensure that air is blocked from entering. A part of the TPMS valve 16 or the air passage section 63 is fitted into a mounting hole 54 provided on a wheel rim 52 of the wheel member 50 with an elastic rubber grommet 56, a washer, and a bolt. Thus, the case 62 is located in the internal space S such that it is supported in a cantilever manner at a point connecting with the air passage section 63. The grommet 56 has specified rigidity and keeps the internal space of the tire 30 airtight. The valve cap 58 protrudes outward from the wheel rim 52. Removing the valve cap 58 to connect the hose of an air supply device to a valve opening (not shown) allows air to be delivered into the tire 30. In the event the tire 30 is deflated, a bottle of tire repair liquid, which may be included in a flat tire repair kit, is connected to the valve opening with the hose to inject tire repair liquid into the tire.

Figure 3:
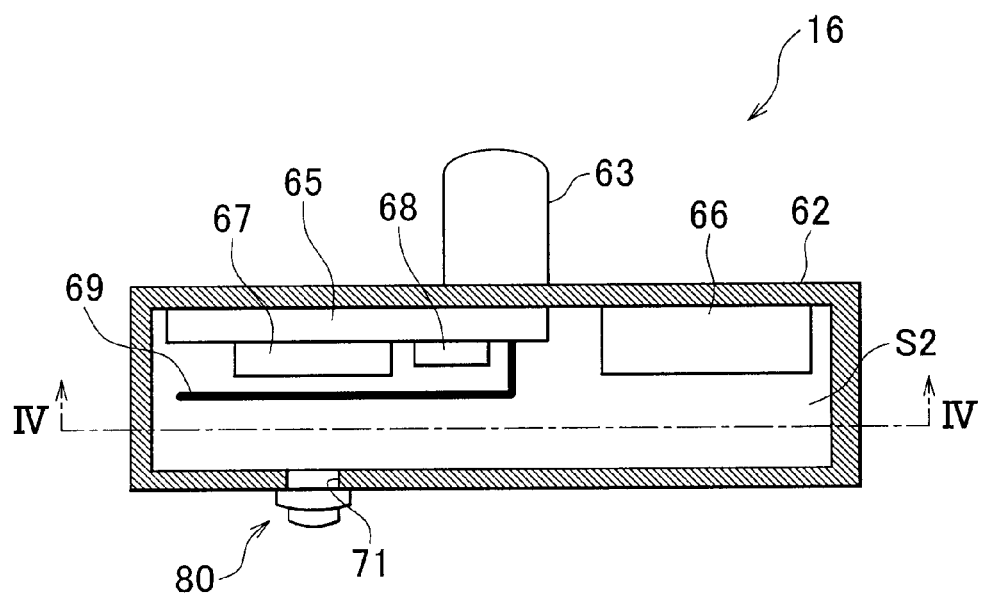
FIG. 3 is a schematic front sectional view of a TPMS valve according to the first embodiment of the invention.
Figure 4:
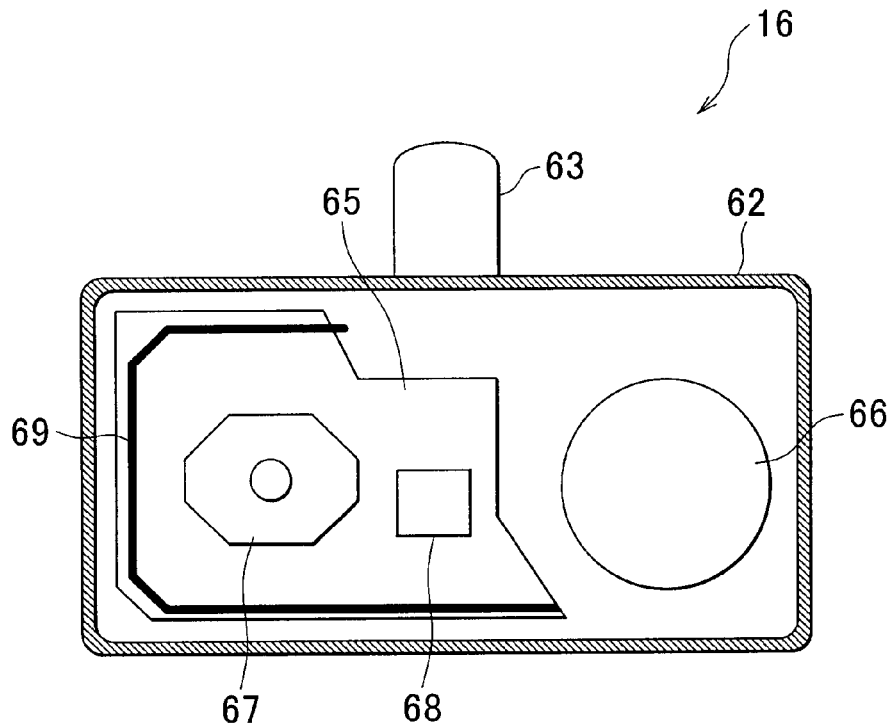
FIG. 4 is a sectional view taken along the line IV-IV in FIG. 3.

FIG. 3 is a schematic front sectional view of the TPMS valve. FIG. 4 is a sectional view taken along the line IV-IV in FIG. 3. As shown in FIGS. 3 and 4, a detection space S2 is formed within the case 62 of the TPMS valve 16. In the detection space S2, a substrate 65, a power supply battery 66, and other devices are provided. On the substrate 65, condition sensors for detecting wheel conditions and a transmitter for sending wheel information are mounted. More specifically, the substrate 65 is provided with an air pressure sensor 67, an acceleration sensor 68, and a TPMS transmitter. Serving as the condition sensors, the air pressure sensor 67 and the acceleration sensor 68 respectively detect the air pressure in the tire 30 and the acceleration rate of the wheel 14 as wheel information. The TPMS transmitter is considered as a transmission section (not shown). Signals output from the respective sensors are sent through an antenna 69 of the TPMS transmitter to the communication unit 22 on the vehicle body 12.

The air pressure sensor 67 may be in the form of a diaphragm of resin film or metal thin film with a piezoelectric element affixed to. The air pressure sensor 67 senses distortion of the piezoelectric element in proportion to the air pressure within the detection space S2, and converts the distortion into output voltage. The acceleration sensor 68 is designed to detect the acceleration rate in a radial direction of the wheel 14 to measure a vehicle running condition based on a centrifugal force applied to the wheel 14.

The embodiment of the invention shows an example where the air pressure sensor 67 and the acceleration sensor 68 are located within the detection space S2 of the TPMS valve 16. Alternatively, additional sensors may be disposed for detecting other wheel conditions. Examples of the additional sensors are a temperature sensor for detecting air temperature in the tire 30 and a sensor for detecting power voltage of the battery 66.

The case 62 is provided with a communication hole 71, and an opening-closing mechanism 80 for opening or closing the communication hole 71. The communication hole 71, which functions as a communication section, is designed to communicate the interior and the exterior of the detection space S2 with each other to introduce air. The opening-closing mechanism 80 functions as a restriction means that restricts the entry of tire repair agent into the detection space S2 through the communication hole 71 during flat tire repair. The details of the mechanism will be discussed later.

Figure 5:
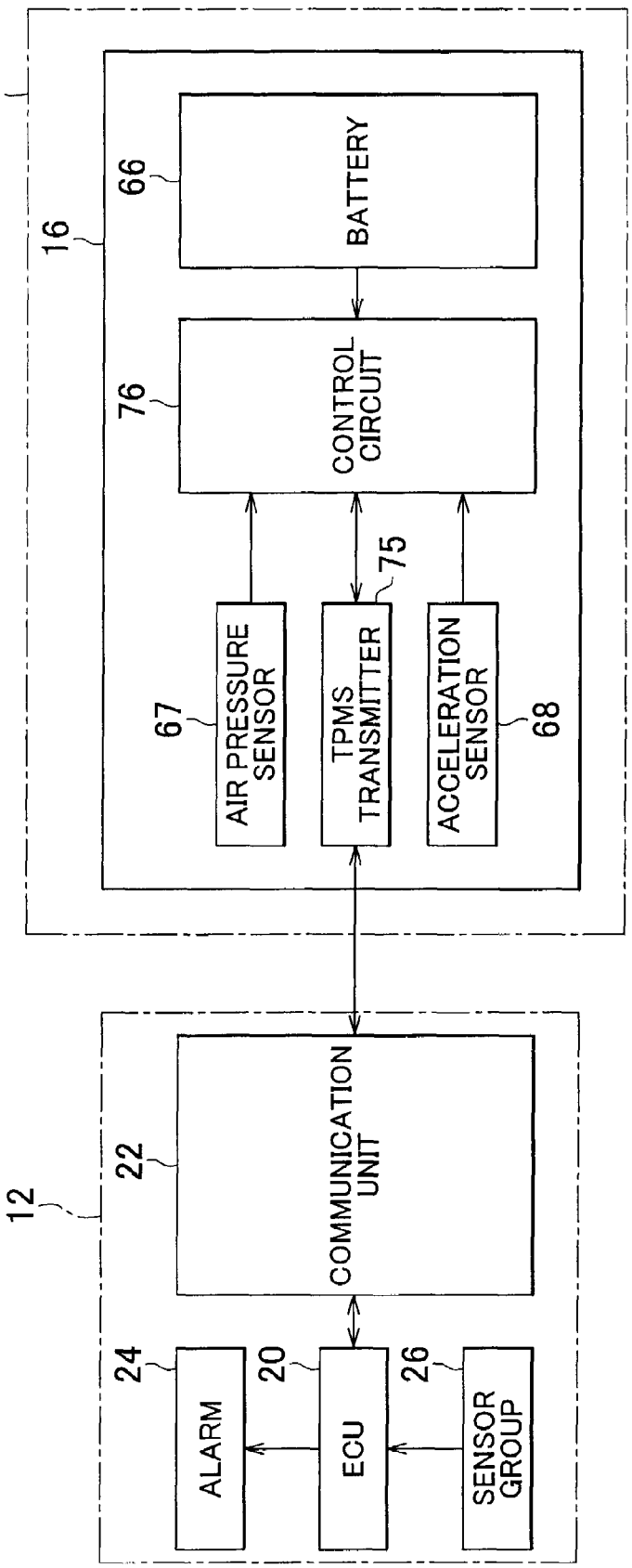
FIG. 5 is a control block diagram for the wheel condition monitor according to the first embodiment of the invention.

FIG. 5 is a control block diagram for the wheel condition monitor according to the first embodiment of the invention.

The aforementioned case 62 of the TPMS valve 16 accommodates not only the battery 66, the air pressure sensor 67, and the acceleration sensor 68, but also a TPMS transmitter 75 and a control circuit 76. The TPMS valve 16 acquires wheel information, such as tire pressure and wheel acceleration rate detected by the respective sensors, and sends the wheel information to the communication unit 22 on the vehicle body 12 periodically.

To be more specific, the TPMS transmitter 75 wirelessly sends the communication unit 22 the wheel information, including signals that indicate the values detected by the air pressure sensor 67 and the acceleration sensor 68. The control circuit 76 is in the form of, for example, an IC chip and mounted on the substrate 65. The control circuit 76 controls the time when the TPMS transmitter 75 sends the wheel information. The battery 66 supplies power to the air pressure sensor 67, the acceleration sensor 68, the TPMS transmitter 75, the control circuit 76 and so forth.

In turn, as shown in FIG. 1, the vehicle body 12 has four communication units 22a-22d associated respectively with the right front wheel 14a, the left front wheel 14b, the right rear wheel 14c, and the left rear wheel 14d (hereinafter collectively called as "communication unit 22"). The communication unit 22, which functions as a receiving section, receives a signal indicative of the wheel information sent from the TPMS transmitter 75 provided on the associated wheel 14. The communication unit 22 also outputs the information to the ECU 20 based on the signal sent from the TPMS transmitter 75 on the associated wheel 14.

The ECU 20 includes: a CPU that performs various computations; a ROM for storing various control programs; a RAM used as a work area for storing data and executing the programs; a nonvolatile backup RAM for holding specific data; and an input-output interface. As shown in FIG. 1, the ECU 20 connects through given signal lines to an alarm 24 and a sensor group 26 including a vehicle speed sensor.

The ECU 20 stores the information received from the communication unit 22 in association with the location of its corresponding wheel 14. This allows the ECU 20 to identify the particular wheel 14 that provided the information through the communication unit 22. As described above, the vehicle body 12 is provided with the plural communication units 22 for respective wheels 14. Other than that, the vehicle body 12 may be provided with a single communication unit that receives signals from the individual TPMS transmitters 75. In such case, a signal to be sent by each TPMS transmitter 75 may contain additional ID information for identifying the wheel 14. The wheel condition information sent from the TPMS transmitter 75 is stored by a predetermined amount in a given storage region (buffer), such as the backup RAM in the ECU 20. The ECU 20 uses the information received from the communication unit 22 to monitor the conditions of the wheel 14.

The alarm 24 is designed to alert a driver under the control by the ECU 20, if certain conditions are met. For example, the alarm 24 may provide the driver with a visual alert on a display provided in the instrument panel or an audible alert. Specifically, if any of the tires 30 is deflated, lowering its air pressure, the ECU 20 receives the wheel information that indicates the low air pressure from the associated TPMS valve 16. Then, the alarm 24 informs the driver of the abnormal air pressure.

Figure 6:
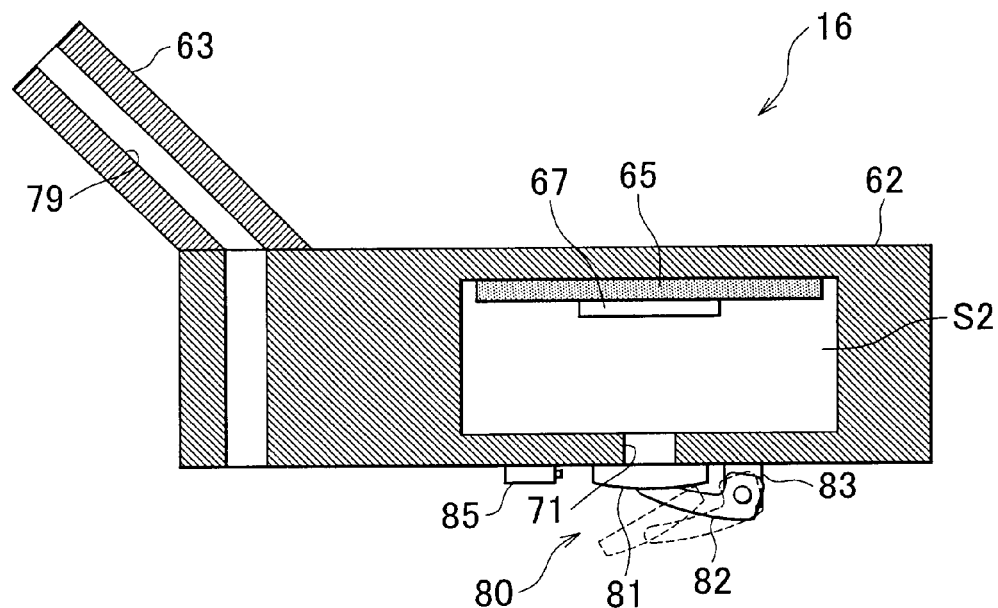
FIG. 6 is a schematic side sectional view of the TPMS valve according to the first embodiment of the invention.

A structure that restricts the entry of foreign matter, such as tire repair agent, into the detection space S2 will be described next. FIG. 6 is a schematic side sectional view of the TPMS valve. For convenience for explanation, FIG. 6 does not show the entire structure of FIG. 3 or other figures.

As described above, the case 62 and the air passage section 63 combine, forming the TPMS valve 16 as a single unit. An air passage 79 runs through the inside of the air passage section 63 and the case 62. In addition to directing the supplied air to the internal space S, the air passage 79 also injects the tire repair agent to an inner circumferential surface of the tire 30. The detection space S2 is formed at a location away from the air passage 79 of the case 62. The communication hole 71 communicates an interior and an exterior of the detection space S2 with each other. The opening-closing mechanism 80 is provided near the communication hole 71 of the case 62 to open or close the communication hole 71.

The opening-closing mechanism 80 includes a lid 81, an arm 82, a pivot member 83, and a torsion coil spring (not shown). The lid 81 is considered as a member for opening or closing the communication hole 71. One end of the arm 82 is fixed to the lid 81. The other end of the arm 82 is pivotably supported by the pivot member 83 fixed to the case 62. The torsion coil spring, considered as an elastic member, is fitted to the pivot member 83. The torsion coil spring impels the arm 82 in a direction that closes the communication hole 71. The torsion coil spring has a spring constant such that the communication hole 71 opens when a centrifugal force applied to the wheel 14 exceeds a predetermined value. To be more specific, when the acceleration due to the centrifugal force substantially exceeds gravitational acceleration, the lid 81 is separated from the communication hole 71 against the impelling force of the torsion coil spring. This brings the communication hole 71 into communication mode.

In the process of flat tire repair, the bottle of tire repair liquid connects to the air passage section 63 with the hose to inject the tire repair liquid into the tire 30. Then, the vehicle 10 is started for the purpose of spreading the injected tire repair liquid all over the inside of the tire 30. At this time, when the centrifugal force applied to the wheel 14 is relatively small due to the low vehicle speed, gravity acts more effectively on the tire repair liquid, causing the liquid to be scattered within the tire 30. Thus, the tire repair liquid is likely to enter the detection space S2 through the communication hole 71. This can cause a detection error of the air pressure sensor 67. As described above, if the centrifugal force applied to the wheel 14 is equal to or below a predetermined value, it is possible for the tire repair liquid to enter the detection space through the communication hole 71. Therefore, the lid 81 closes the communication hole 71 as shown by the solid line in FIG. 6. In contrast, if the centrifugal force applied to the vehicle 14 increases to a certain level as the vehicle speed increases, this centrifugal force presses the tire repair liquid on the inner circumferential surface of the tire 30, making the tire repair liquid stable thereon. Thus, the tire repair liquid is less likely to be scattered within the tire 30. Therefore, the lid 81 is lifted from the communication hole 71, as shown by the broken line in FIG. 6, to allow the air to pass through the communication hole 71 so that the air pressure sensor 67 can detect the air pressure inside the tire.

The case 62 is provided with a disconnection detecting sensor 85 next to the opening-closing mechanism 80. The disconnection detecting sensor 85 is designed to detect if the lid 81 is closed or the communication hole 71 is in disconnection mode. Detecting that the lid 81 is closed, the disconnection detecting sensor 85 outputs a signal indicating that the lid 81 is closed. When the control circuit 76 acquires the information that the communication hole 71 is in disconnection mode, which is output from the disconnection detecting sensor 85, the control circuit 76 prohibits the TPMS transmitter 75 from sending the air pressure information. In this case, the control circuit 76 may be considered as a transmission restriction section.

More specifically, the communication hole 71 is in disconnection mode, that is, the interior of the case 62 or the detection space S2 is disconnected from the internal space S. This can produce different conditions between the internal space S and the detection space S2. Assuming that the air pressure is detected by the air pressure sensor 67 under such conditions and sent to the ECU 20 on the vehicle body 12, based on this air pressure information, the ECU 20 can perform the improper step of, for example, erroneously making the alarm 24 alert a driver. Therefore, the air pressure information on the tire 30 is prohibited from being sent, if the communication hole 71 is in disconnection mode. Other than prohibiting the transmission of the air pressure information alone, the TPMS transmitter 75 may be stopped from sending any wheel information during this disconnection mode. This avoids unnecessary information transmission, thereby reducing excessive consumption of power from the battery 66.

As discussed above, in the embodiment of the invention, the opening-closing mechanism 80 is provided for opening or closing the communication hole 71 formed through the case 62 of the TPMS valve 16. This restricts the entry of tire repair agent into the detection space S2 through the communication hole 71 during flat tire repair. Therefore, the tire repair agent is prevented from contacting the air pressure sensor 67, thus having no adverse effect on the accuracy of the detection by the air pressure sensor 67. Thereby, the air pressure sensor 67 maintains normal detection performance. Consequently, the TPMS valve 16 sends the correct wheel information to the ECU 20, which allows the wheel condition monitor to continue normal operations. This permits TPMS-equipped vehicles to use a tire repair liquid.

The opening-closing mechanism 80, which is a mechanical device including the lid 81 and the torsion coil spring, utilizes a centrifugal force applied to the wheel 14 to automatically open or close the communication hole 71. This eliminates the necessity of additional devices, such as a sensor for detecting a centrifugal force and an actuator for actuating the lid 81. Therefore, the present invention is embodied simply at a low cost.

The second embodiment of the present invention will now be described. The second embodiment is approximately the same as the first embodiment, except the configuration of the opening-closing mechanism. Thus, like numerals are used to represent like elements among the first and second embodiments as needed, and, if appropriate, descriptions of the like elements will not be repeated.

Figure 7:
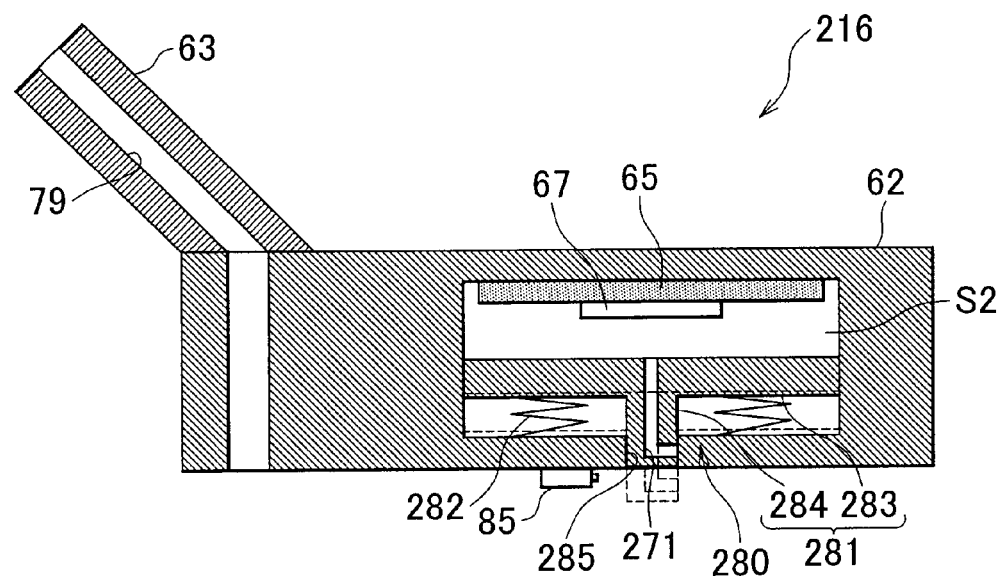
FIG. 7 is a schematic side sectional view of a TPMS valve according to the second embodiment of the invention.

FIG. 7 is a schematic side sectional view of a TPMS valve according to the second embodiment of the invention. In a TPMS valve 216, an opening-closing mechanism 280 includes an opening-closing member 281 and a spring 282. The opening-closing member 281 has a communication passage 271 therein. The spring 282 is an elastic member that impels the opening-closing member 281 in the closing direction.

The opening-closing member 281 has a base section 283 and a communication hole forming section 284. The base section 283 moves along inner walls of the detection space S2 towards or away from the air pressure sensor 67. The communication hole forming section 284 has a cylindrical shape that extends from the center of the base section 283 in a direction opposite from the air pressure sensor 67. A guide hole 285 is formed in the case 62. A distal end of the communication hole forming section 284 is inserted slidably through the guide hole 285. A communication passage 271 runs through the communication hole forming section 284 to communicate the interior and the exterior of the detection space S2 with each other. The communication passage 271 bends at the distal end of the communication hole forming section 284 and extends sideward thereof. Thus, as shown by the solid line in FIG. 7, when the opening-closing member 281 is accommodated in the detection space S2, a tip distal end of the communication passage 271 is closed and disconnected by a wall of the guide hole 285. In turn, as shown by the broken line in FIG. 7, the opening-closing member 281 moves relative to the case 62 in the direction away from the air pressure sensor 67. This causes the tip distal end of the communication passage 271 to be exposed to the exterior of the case 62. This brings the communication passage 271 into communication mode, so that the air can pass through.

The spring 282 is interposed between the inner surface of the case 62 and the base section 283 to urge or impel the opening-closing member 281 in a direction to close the communication passage 271. The spring 282 has a spring constant such that the communication passage 271 is opened when a centrifugal force applied to the wheel 14 exceeds a predetermined value. More specifically, the spring constant is predetermined such that, when the acceleration due to the centrifugal force substantially exceeds the acceleration of gravity, the opening-closing member 281 moves against the urging or impelling force of the spring 282, thereby causing the tip distal end of the communication passage 271 to be exposed to the exterior of the case 62 to bring the communication passage 271 into communication mode.

As described above, in the second embodiment of the invention, the opening-closing mechanism 280 is also provided in order to open or close the communication passage 271 formed in the opening-closing member 281 of the TPMS valve 216. This restricts the entry of tire repair agent into the detection space S2 through the communication passage 271 during flat tire repair. The opening-closing mechanism 280, which is a mechanical device including the opening-closing member 281 and the spring 282, utilizes a centrifugal force applied to the wheel 14 to automatically open or close the communication passage 271. Therefore, the second embodiment provides the same effects as in the first embodiment.

The opening-closing member 281 is designed such that the distal end of the communication hole forming section 284 slides within the guide hole 285. This results in an advantage of externally discharging the tire repair agent that may adhere to an area near the opening of the guide hole 285. Therefore, while the air pressure sensor 67 detects the air pressure, the adhesion of the tire repair agent to the communication passage 271 is prevented or reduced. Thus, the communication passage 271 is always favorably held in communication mode.

The third embodiment of the present invention will now be described. The third embodiment is approximately the same as the first embodiment, except that the opening-closing mechanism is actuated by the actuator. Thus, like numerals are used to represent like elements among the first and third embodiments as needed, and, if appropriate, descriptions of the like elements will not be repeated.

Figure 8:
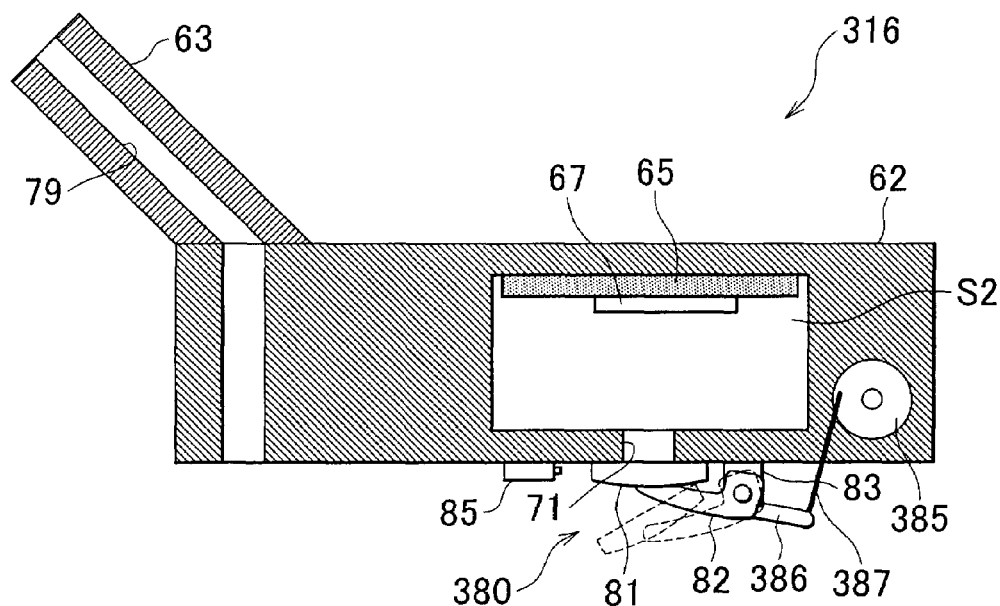
FIG. 8 is a schematic side sectional view of a TPMS valve according to the third embodiment of the invention.

FIG. 8 is a schematic side sectional view of a TPMS valve according to the third embodiment of the invention. In a TPMS valve 316, an opening-closing mechanism 380 includes the lid 81, the arm 82, the pivot member 83, and the torsion coil spring (not shown), as described in the first embodiment. However, the lid 81 is designed not to automatically open due to the centrifugal force, but to be actuated by an actuator 385 to the open or closed position.

The case 62 is provided with the actuator 385 that rotates based on the magnitude of acceleration detected by the acceleration sensor 68, which has been discussed in the first embodiment. The actuator 385 is connected to a joint section 386 via a connecting rod 387. The joint section 386 extends in the direction opposite from the lid 81 of the arm 82. Rotational motion of the actuator 385 causes the lid 81 to open or close.

The control circuit 76 drives the actuator 385 to actuate the lid 81 to the open position, if the centrifugal force applied to the wheel 14 exceeds a predetermined value, in other words, the acceleration rate detected by the acceleration sensor 68 exceeds the acceleration of gravity. In turn, the control circuit 76 causes the lid 81 to close, if the acceleration rate is equal to or lower than the acceleration of gravity. This restricts the entry of the tire repair agent into the detection space S2 through the communication hole 71.

In another case the acceleration sensor 68 detects zero acceleration, that is, the wheel 14 stops rotating. After a predetermined period of time has elapsed since the detection of the rotation stop, the control circuit 76 drives the actuator 385 to actuate the lid 81 to the open position. More specifically, when the vehicle 10 starts moving after the injection of tire repair agent and then stops, the tire repair agent is displaced over time to the bottom surface of the tire 30 due to the gravity. Thus, the displaced tire repair agent, does not enter the case 62 through the communication hole 71. This brings the communication hole 71 into communication mode, and therefore enables detection of the conditions of the wheel 14 during the stop of the vehicle 10. In the third embodiment of the invention, the acceleration sensor 68 may be considered as a stop state detecting section.

As discussed above, in the third embodiment of the invention, the opening-closing mechanism 380 is also provided for opening or closing the communication hole 71 formed through the case 62 of the TPMS valve 316. This restricts the entry of the tire repair agent into the detection space S2 through the communication hole 71 during flat tire repair. Therefore, the third embodiment also provides the same effects as in the first embodiment, except that the configuration of the opening-closing mechanism 380 is somewhat more complicated due to the addition of the actuator 385.

The actuator 385 actuates the lid 81 to the open or closed position, ensuring accurate operation of the lid 81. In addition, when the vehicle 10 stops, the lid 81 opens to obtain the air pressure information. This advantageously improves the accuracy to monitor the wheel conditions.

The fourth embodiment of the present invention will now be described. Compared to the first embodiment, the fourth embodiment employs a different configuration of restriction means for preventing the tire repair agent from entering through the communication hole. Otherwise, the fourth embodiment uses some common elements to the first embodiment. Thus, like numerals are used to represent like elements among the first and fourth embodiments as needed, and, if appropriate, descriptions of the like elements will not be repeated.

Figure 9:
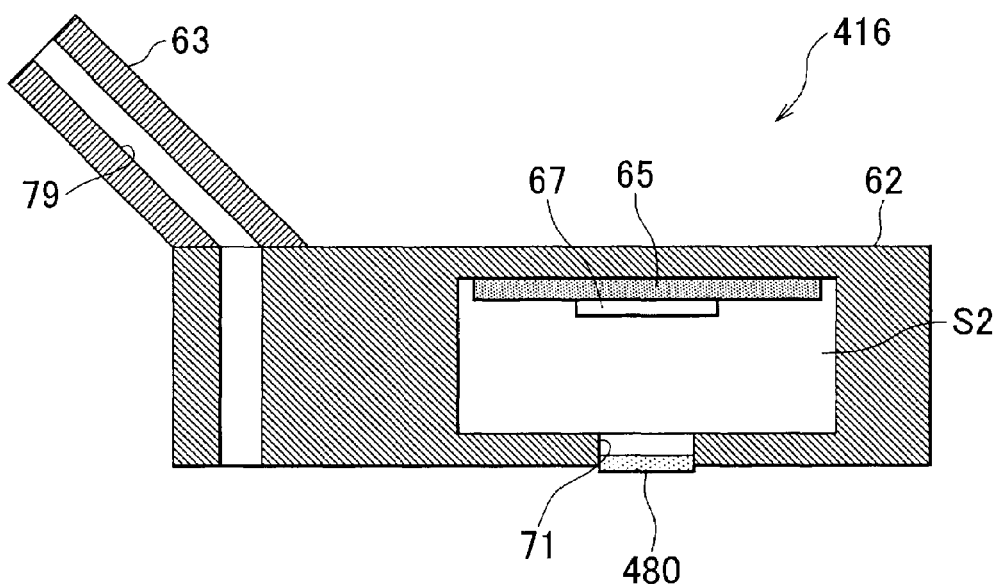
FIG. 9 is a schematic side sectional view of a TPMS valve according to the fourth embodiment of the invention.

FIG. 9 is a schematic side sectional view of a TPMS valve according to the fourth embodiment of the invention. A TPMS valve 416 has a permeable membrane 480, which is provided as the restriction means for preventing the tire repair agent from entering through the communication hole 71. The permeable membrane 480 is attached to block the opening of the communication hole 71 not to allow passage of the tire repair agent, but to allow passage of the air.

According to the fourth embodiment of the invention, the restriction means for preventing the entry of the tire repair agent is very simple in configuration.

The fifth embodiment of the present invention will now be described. Compared to the first embodiment, the fifth embodiment employs a different configuration of restriction means for preventing the tire repair agent from entering through the communication hole. Otherwise, the fifth embodiment uses some common elements to the first embodiment. Thus, like numerals are used to represent like elements among the first and fifth embodiments as needed, and, if appropriate, descriptions of the like elements will not be repeated.

Figure 10:
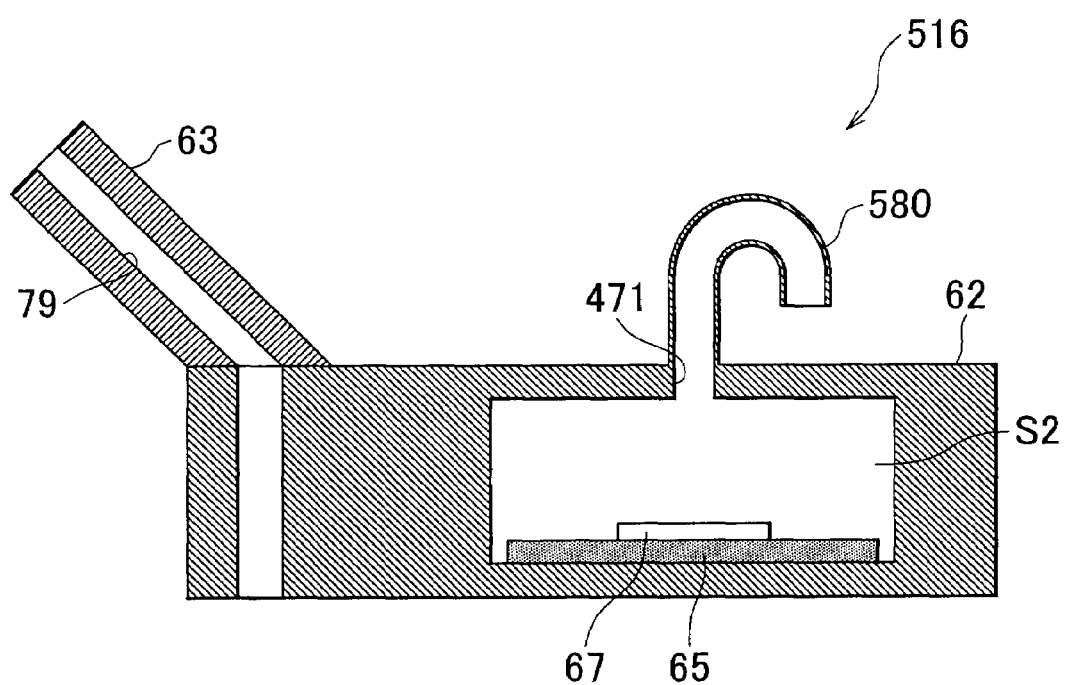
FIG. 10 is a schematic side sectional view of a TPMS valve according to the fifth embodiment of the invention.

FIG. 10 is a schematic side sectional view of a TPMS valve according to the fifth embodiment of the invention. A TPMS valve 516 has a communication hole 471 formed on the side where the air passage section 63 of the case 62 is situated, that is, on the side closer to the wheel member 50. A U-shaped pipe 580 extends from the case 62. An internal passage of the U-shaped pipe 580 defines the communication hole 471. The U-shaped pipe 580 bends in the middle, and a distal end of the pipe 580 faces the surface of the case 62. Accordingly, the substrate 65, on which the air pressure sensor 67 is mounted, is fixed to an inner surface of the case 62 opposite to the inner surface described in the first embodiment.

In the TPMS valve 516 thus configured, a distance between the communication hole 471 and the wheel member 50 is relatively short (see FIG. 2). However, should the U-shaped pipe 580 be immersed in the tire repair agent, the air accumulates within the U-shaped pipe 580, preventing the tire repair agent from entering the detection space S2.

According to the fifth embodiment of the invention, the restriction means for preventing the entry of the tire repair agent is also very simple in configuration.

According to the first to third embodiments, the disconnection detecting sensor 85 is provided. Upon detection that the communication hole is in disconnection mode, the control circuit 76 prohibits the TPMS transmitter 75 from sending the air pressure information. Alternatively, instead of prohibiting the transmission of the air pressure information, the air pressure information currently obtained may be invalidated. For example, in the control circuit 76, the information on the air pressure currently detected may be invalidated and abandoned. Further alternatively, the TPMS transmitter 75 may send the air pressure information with additional identifying information, such as flag, to indicate the invalidity of the information. In this case, the ECU 20 reads the flag, recognizes that the received air pressure information is invalid, and abandons the invalid information.

In the aforementioned embodiments, the air pressure sensor 67 is illustrated as one example of the condition sensors. However, any sensor may be employed, as long as the sensor is disposed within the case 62 and involves a communication section for communicating the interior and the exterior of the detection region with each other. The sensor may include a temperature sensor that detects the temperature in the tire 30, and a variety of sensors that detect different wheel conditions, other than the tire conditions, such as voltage of the battery 66. The communication section does not necessarily have to be formed as a hole. Alternatively, a gap, which is created between the components of the case, may serve as the communication section.

According to the aforementioned embodiments, the invention prevents the entry of tire repair agent through the communication hole. In addition, the invention may be able to prevent the entry of water or other exfoliated materials of the tire.

Further, according to the aforementioned embodiments, a run-flat tire is employed as an example of the tire that forms the wheel 14. The run-flat tire may be replaced with a conventional tire.

While example embodiments of the invention have been described above, it is to be understood that the invention is not limited to details of the described embodiments, but may be embodied with various changes, modifications or improvements, which may occur to those skilled in the art, without departing from the spirit and scope of the invention.

What is claimed is:

1. A wheel condition detector that detects a condition of a wheel comprising:
    a case that is located in an internal space between a tire and a wheel member, the tire and the wheel member forming a wheel, wherein the case includes a detection space formed therein and includes a communication section that communicates the detection space with the internal space;
    a condition sensor located in the detection space that detects a condition of the wheel; and
    a restriction section that restricts an entry of foreign matter that exists in the internal space into the detection space through the communication section, wherein the restriction section includes a mode switching section that switches the communication section from a communication mode to a disconnection mode, if a preset condition, under which the foreign matter is expected to enter the detection space, is met.

2. The wheel condition detector according to claim 1, wherein the mode switching section switches the communication section into the disconnection mode, if a centrifugal force applied to the wheel is equal to or below a predetermined value, and switches the communication section into the communication mode, if the centrifugal force applied to the wheel exceeds the predetermined value.

3. The wheel condition detector according to claim 2, wherein the mode switching section switches the communication section into the disconnection mode, if the centrifugal force applied to the wheel is equal to or below gravity acting on the wheel, and switches the communication section into the communication mode, if the centrifugal force applied to the wheel exceeds the gravity acting on the wheel.

4. The wheel condition detector according to claim 2, wherein
    the communication section includes a communication hole, and
    the mode switching section includes an opening-closing member for opening or closing the communication hole to the internal space; and includes an elastic member that impels the opening-closing member in a direction to close the opening-closing member,
    the opening-closing member closes the communication hole if the centrifugal force is equal to or below the predetermined value, and opens the communication hole against an impelling force of the elastic member if the centrifugal force exceeds the predetermined value.

5. The wheel condition detector according to claim 4, wherein the opening-closing member includes a lid member that opens and closes the communication hole.

6. The wheel condition detector according to claim 4, wherein the opening-closing member includes a communication hole forming section that has a communication passage running through the communication hole forming section and slides in the communication hole, and wherein the communication passage is opened and closed in accordance with the sliding movement of the communication forming section relative to the case.

7. The wheel condition detector according to claim 4, wherein the opening-closing member slides within the communication hole or in an area near an opening of the communication hole when the opening-closing member is moved in an opening direction or the closing direction in order to discharge the foreign matter from the communication hole to the internal space.

8. The wheel condition detector according to claim 1, further comprising:
- a transmission section that sends wheel information indicative of the condition of the wheel detected by the condition sensor to a vehicle-mounted device;
- a disconnection detecting sensor that detects the disconnection mode of the communication section switched by the mode switching section; and
- a transmission restriction section that prohibits the transmission section from sending the wheel information or that invalidates the wheel information, if the disconnection detecting sensor detects the disconnection mode of the communication section,
- wherein a wheel condition monitor includes the wheel condition detector and the vehicle mounted device.

9. The wheel condition detector according to claim 1, further comprising:
- a stop state detecting section for detecting if the wheel stops rotating; and
- an actuator that actuates the mode switching section to bring the communication section into the communication mode after a predetermined period of time elapses after the stop state detecting section detects that the wheel stops rotating,
- wherein the wheel condition detector is provided on a rim of the wheel member.

10. A wheel condition monitor comprising:
- a wheel-mounted device that is provided for a wheel and sends wheel information that indicates a wheel condition to a vehicle body; and
- a vehicle-mounted device that is mounted on the vehicle body and monitors the wheel condition based on the wheel information received from the wheel-mounted device, the wheel-mounted device comprising:
- a case located in an internal space defined between a tire and a wheel member, the tire and the wheel member forming a wheel, wherein the case includes a detection space formed therein and includes a communication section for communicating the detection space with the internal space;
- a condition sensor located in the detection space that detects a condition of the wheel; and
- a restriction section that restricts an entry of foreign matter that exists in the internal space into the detection space through the communication sections,
- wherein the restriction section includes a mode switching section that switches the communication section from communication mode to disconnection mode, if a preset condition, under which the foreign matter is expected to enter the detection space, is met.

11. The wheel condition monitor according to claim 10, further comprising:
- a disconnection detecting sensor that detects the disconnection mode of the communication section switched by the mode switching section; and
- a transmission restriction section that prohibits the wheel-mounted device from sending the wheel information or that invalidates the wheel information sent by the wheel mounted device, if the disconnection detecting sensor detects the disconnection mode of the communication section.

12. The wheel condition detector according to claim 1, wherein the foreign matter is a flat tire repair liquid.

* * * * *